United States Patent [19]

Dyer et al.

[11] Patent Number: 5,753,359
[45] Date of Patent: May 19, 1998

[54] FOAM MATERIALS FOR INSULATION, DERIVED FROM HIGH INTERNAL PHASE EMULSIONS

[75] Inventors: John Collins Dyer; Thomas Allen DesMarais, both of Cincinnati, Ohio

[73] Assignee: The Procter & Gamble Company, Cincinnati, Ohio

[21] Appl. No.: 680,400

[22] Filed: Jul. 15, 1996

Related U.S. Application Data

[62] Division of Ser. No. 484,727, Jun. 7, 1995.

[51] Int. Cl.$^6$ ............................................. B32B 3/26
[52] U.S. Cl. ........................... 428/315.5; 428/304.4; 521/65
[58] Field of Search ................. 428/315.5; 4/304.4; 521/64

[56] References Cited

U.S. PATENT DOCUMENTS

| | | | |
|---|---|---|---|
| 3,255,127 | 6/1966 | Von Bonin et al. | 260/2.5 |
| 3,256,219 | 6/1966 | Will | 260/2.5 |
| 3,431,911 | 3/1969 | Meisel, Jr. | 128/287 |
| 3,563,243 | 2/1971 | Lindquist | 128/287 |
| 3,565,817 | 2/1971 | Lissant | 252/312 |
| 3,640,753 | 2/1972 | Krauch et al. | 117/62.2 |
| 3,734,867 | 5/1973 | Will | 260/2.5 R |
| 3,763,056 | 10/1973 | Will | 260/2.5 L |
| 3,778,390 | 12/1973 | Ulrich, Jr. | 260/2.5 AN |
| 3,806,474 | 4/1974 | Blair | 260/2.5 AG |
| 3,988,508 | 10/1976 | Lissant | 526/344 |
| 3,993,074 | 11/1976 | Murray et al. | 128/286 |
| 3,994,298 | 11/1976 | DesMarais | 128/285 |
| 4,029,100 | 6/1977 | Karami | 128/284 |
| 4,049,592 | 9/1977 | Marans et al. | 260/2.5 AD |
| 4,061,145 | 12/1977 | DesMarais | 128/275 |
| 4,067,832 | 1/1978 | DesMarais | 260/2.5 AB |
| 4,093,570 | 6/1978 | Miyake et al. | 260/2.5 B |
| 4,110,276 | 8/1978 | DesMarais | 521/123 |
| 4,132,839 | 1/1979 | Marans et al. | 521/159 |
| 4,262,052 | 4/1981 | Kannan et al. | 428/306 |
| 4,376,440 | 3/1983 | Whitehead et al. | 604/387 |
| 4,394,930 | 7/1983 | Korpman | 220/444 |

(List continued on next page.)

FOREIGN PATENT DOCUMENTS

| | | |
|---|---|---|
| 0 017 671 A1 | 10/1980 | European Pat. Off. |
| 0 017 672 A1 | 10/1980 | European Pat. Off. |
| 0 049 769 A1 | 4/1982 | European Pat. Off. |
| 0 068 830 A1 | 1/1983 | European Pat. Off. |
| 0 299 762 | 1/1989 | European Pat. Off. |
| 0 480 378 A2 | 4/1992 | European Pat. Off. |
| 1340520 | 9/1963 | France |
| 3 109 929 A1 | 1/1982 | Germany |
| 2-239863 | 9/1990 | Japan |
| 2-289608 | 11/1990 | Japan |
| 3-49759 | 3/1991 | Japan |
| 1 493 356 | 11/1977 | United Kingdom |
| 2 188 055 A | 9/1987 | United Kingdom |
| WO 94/28839 | 12/1994 | WIPO |

OTHER PUBLICATIONS

Structure of High Internal Phase Ratio Emusions, Lissant, pp. 416–423, 1974.
A Study of Medium and High Internal Phase Ratio Water/Polymer Emulsions, Lissant, pp. 201–108, 1973.
The Geometry of High–Internal–Phase Ratio Emulsions, Lissant, pp. 462–468 1966.
Low Density, Microcellular polystyrene foams, Aubert and Clough, pp. 2047–2054, 1985.
Mechanical Structure Property Relationships of Microcellular, Low Density Foams, LeMay, pp. 21–26, 1991.
New Melamine–based elastic foam, Weber and Kruckau, pp. 843–848, 1985.
Preparation of multishell ICF target plastic foam cushion materials by thermally induced phase inversion processes, Young, Moreno and Marsters, pp. 1094–2004, 1981.
Cellular Solids Structure & Properties, Gibson and Ashby, pp. 120–200, 1988.
Aerogels, Jochen Fricke, pp. 92–97.
"Polymeric Foam Materials on Filtration Media", Z. Blumgara, Filtration and Separation (March 1995), p.245–251.
High Internal Phase Water–In–Oil Emulsions: Influence of Surfactants and Cosurfactants on Emulsion Stability and Foam Quality, Williams, pp. 1–10.

(List continued on next page.)

*Primary Examiner*—Morton Foelak
*Attorney, Agent, or Firm*—Carl J. Roof; E. Kelly Linman; Jacobus C. Rasser

[57] ABSTRACT

The present invention relates to compressable polymeric foam materials useful as insulation. These polymeric foams are prepared by polymerization of certain water-in-oil emulsions having a relatively high ratio of water phase to oil phase, commonly known as "HIPEs." The polymeric foam materials comprise a generally hydrophobic, flexible or semi-flexible, nonionic polymeric foam structure of interconnected open-cells. The foam structures have:

(a) a specific surface area per foam volume of at least about 0.01 m$^2$/cc;

(b) an expanded density of less than about 0.05 g/cc; and (c) a ratio of expanded to compressed thickness of at least about 3:1;

wherein when the foam is compressed to 33% of its original expanded thickness and is thereafter maintained without artificial restraint on its surface, said foam will reexpand by no more than 50% after 21 days at ambient temperature (22° C.).

In a preferred embodiment, the foams of the present invention, when heated to their Tg or higher, will reexpand to 90% of their original thickness within about 1 day or less.

The invention also relates to a process for making the compressible polymeric foam material comprising polymerizing a water-in-oil emulsion having a volume to weight ratio of water phase to oil phase in the range of from about 20:1 to about 250:1.

2 Claims, 1 Drawing Sheet

U.S. PATENT DOCUMENTS

| | | | |
|---|---|---|---|
| 4,425,130 | 1/1984 | DesMarais | 604/389 |
| 4,473,611 | 9/1984 | Haq | 428/198 |
| 4,522,953 | 6/1985 | Barby et al. | 521/64 |
| 4,536,521 | 8/1985 | Haq | 521/146 |
| 4,540,717 | 9/1985 | Mahnke et al. | 521/52 |
| 4,554,297 | 11/1985 | Dabi | 521/178 |
| 4,603,069 | 7/1986 | Haq et al. | 428/76 |
| 4,606,958 | 8/1986 | Haq et al. | 428/68 |
| 4,611,014 | 9/1986 | Jones et al. | 521/146 |
| 4,612,334 | 9/1986 | Jones et al. | 521/146 |
| 4,613,543 | 9/1986 | Dabi | 428/304.4 |
| 4,668,709 | 5/1987 | Jones et al. | 521/146 |
| 4,724,242 | 2/1988 | Vassileff | 521/83 |
| 4,725,628 | 2/1988 | Garvey et al. | 521/137 |
| 4,731,391 | 3/1988 | Garvey | 521/137 |
| 4,740,528 | 4/1988 | Garvey et al. | 521/128 |
| 4,775,655 | 10/1988 | Edwards et al. | 502/416 |
| 4,788,225 | 11/1988 | Edwards et al. | 521/147 |
| 4,797,310 | 1/1989 | Barby et al. | 428/71 |
| 4,839,395 | 6/1989 | Masamizu et al. | 521/56 |
| 4,957,810 | 9/1990 | Eleouet et al. | 428/306.6 |
| 4,959,341 | 9/1990 | Wallach | 502/404 |
| 4,961,982 | 10/1990 | Taylor | 428/41 |
| 4,965,289 | 10/1990 | Sherrington et al. | 521/53 |
| 4,966,919 | 10/1990 | Williams, Jr. et al. | 521/54 |
| 4,972,002 | 11/1990 | Volkert | 521/120 |
| 4,973,610 | 11/1990 | Hahn et al. | 521/89 |
| 4,985,467 | 1/1991 | Kelly et al. | 521/52 |
| 4,985,468 | 1/1991 | Elmes et al. | 521/63 |
| 4,990,541 | 2/1991 | Neilsen et al. | 521/70 |
| 4,992,254 | 2/1991 | Kong | 423/449 |
| 5,021,462 | 6/1991 | Elmes et al. | 521/63 |
| 5,034,424 | 7/1991 | Wenning et al. | 521/109.1 |
| 5,037,859 | 8/1991 | Williams, Jr. et al. | 521/55 |
| 5,047,225 | 9/1991 | Kong | 423/447.2 |
| 5,065,752 | 11/1991 | Sessions et al. | 128/156 |
| 5,066,684 | 11/1991 | LeMay | 521/64 |
| 5,066,784 | 11/1991 | Sherrington et al. | 530/334 |
| 5,110,838 | 5/1992 | Tokiwa et al. | 521/81 |
| 5,116,880 | 5/1992 | Tokiwa et al. | 521/134 |
| 5,116,883 | 5/1992 | LeMay | 521/178 |
| 5,128,382 | 7/1992 | Elliott, Jr. et al. | 521/178 |
| 5,134,007 | 7/1992 | Reising et al. | 428/78 |
| 5,134,171 | 7/1992 | Hammel et al. | 521/98 |
| 5,147,345 | 9/1992 | Young et al. | 604/378 |
| 5,149,720 | 9/1992 | DesMarais et al. | 521/63 |
| 5,189,070 | 2/1993 | Brownscombe et al. | 521/64 |
| 5,198,472 | 3/1993 | DesMarais et al. | 521/63 |
| 5,200,433 | 4/1993 | Beshouri | 521/64 |
| 5,210,104 | 5/1993 | Bass et al. | 521/64 |
| 5,210,108 | 5/1993 | Spinu et al. | 521/182 |
| 5,221,726 | 6/1993 | Dabi et al. | 528/93 |
| 5,250,576 | 10/1993 | DesMarais et al. | 521/63 |
| 5,250,579 | 10/1993 | Smits et al. | 521/98 |
| 5,252,619 | 10/1993 | Brownscombe et al. | 521/64 |
| 5,260,345 | 11/1993 | DesMarais et al. | 521/148 |
| 5,268,224 | 12/1993 | DesMarais et al. | 428/286 |
| 5,276,067 | 1/1994 | Doerge | 521/131 |
| 5,290,820 | 3/1994 | Brownscombe et al. | 521/64 |
| 5,318,554 | 6/1994 | Young et al. | 604/378 |
| 5,331,015 | 7/1994 | DesMarais et al. | 521/62 |
| 5,336,208 | 8/1994 | Rosenbluth et al. | 604/329 |
| 5,336,695 | 8/1994 | Nass et al. | 521/109.1 |
| 5,352,711 | 10/1994 | DesMarais | 521/149 |
| 5,387,207 | 2/1995 | Dyer et al. | 604/369 |

OTHER PUBLICATIONS

Summary Abstract: Low–density polystrene foam materials for direct–drive last inertial confinement fusion targets, Kong, Cook, Haendler, Hair and Letts, J. Vac. Sci. Tech 1988, A6(3), 1894–1895.

Synthesis and Ultrastructural Studies of Styrene–Divinylbenzene Polyhipe Polymers, Hainey, Huxham, Rowatt and Sherrington, Macromolecules, 1991, 24, 117–121.

FOAM MATERIALS FOR INSULATION, DERIVED FROM HIGH INTERNAL PHASE EMULSIONS

This is a division of application Ser. No. 08/484,727, filed on Jun. 7, 1995.

FIELD OF THE INVENTION

This application relates to microporous, open-celled polymeric foam materials suitable as insulation materials. The application particularly relates to insulating foam materials made from high internal phase emulsions which can be compressed into a thin state and expanded at the site of use.

BACKGROUND OF THE INVENTION

The development of efficient and effective insulating materials has been the subject of substantial commercial interest. This is particularly true for materials which are thermal insulators, e.g. those which reduce the rate of heat loss (or gain) of any device, construct, or container. Foams are broadly used as insulators. References describing such uses and properties of foams include Oertel, G. "Polyurethane Handbook" Hanser Publishers, Munich, 1985, Glicksman, L. R. In "Low Density Cellular Plastics"; Hilyard, N. C. and Cunningham, A., Ed.; Chapman & Hall, London, 1994, and Gibson, L. J.; Ashby, M. F. "Cellular Solids. Structure and Properties" Pergamon Press, Oxford, 1988. The term "insulator" refers to any material which reduces the transfer of energy from one location to another. Such energy includes heat, acoustic, and/or mechanical types. Heat insulation is of particular importance and relates to the thermal conductivity of the insulating medium.

The "perfect" insulator is a vacuum. Developing and maintaining an evacuated space around the area to be insulated can, however, be impractical, particularly for larger volumes. The structural integrity required to withstand atmospheric pressure acting upon a vacuum vessel can be an issue.

A common insulating medium is a foam or cellular material having porous regions surrounded by a solid that provides integrity. The function of the foam as an insulator is to trap air and reduce thermal conductivity. Foams are generally characterized by the size of the pores or cells within the structure as well as their density, which approximates the ratio of open-to-solid structure within the foam.

The thermal conductivity of any foam depends on four characteristics:

1. convection through the pores;
2. conduction through the gas;
3. conduction through the polymer; and
4. thermal radiation through the cell walls and across the cell voids.

Convection via movement of a gas through pores of an insulating to medium is negligible in foams having cell sizes smaller than about 4 mm. Convection through pores is suppressed in cells smaller than 10 mm. Most foams have cells much smaller than these dimensions.

Conduction through the gas typically can account for as much as two thirds of the systems thermal conduction. For this reason, foams filled with low conductivity gases can be preferred, although the gas will typically exchange with the atmosphere over time. Conduction through the solid polymer is negligible with low density foams (e.g. less than about 0.08 g/cc).

Thermal radiation can account for one-quarter to one-third of the thermal conductivity in a foam. (See Glicksman, L. R; Torpey, M.; Marge, A. *J. Cell. Plastics* 1992, 28, 571 and DeVos, R; Rosbotham, D.; Deschaght, J. ibid. 1994, 30, 302.) Radiative heat transfer is highly dependent on the cell size of the foam and decreases with cell size (which preferably would be $\leq 100$ μm). Kodama et al. (ibid, 1995, 31, 24) report on improvements in the k factor (a measure of thermal insulation ability) of a series of polyurethane foams ("PUFs") as average cell sizes decreased from 350 μm to 200 μm at a density of 0.052 g/cc. Doerge reports that foams with densities lower than about 0.037 g/cc show increases in thermal conductivity attributable to the increase in cell sizes that typically occurs at these lower densities (Doerge, H. P. ibid, 1992, 28, 115), in part due to the increasing transparency of the cell walls and cell wall rupture (allowing rapid diffusion of the low conductivity gas filler). The best insulating rigid foams are low density foams (ca. 0.03–0.07 g/cc for closed cell PUFs) having the smallest cells possible filled with a gas having a low coefficient of thermal conductivity (or no gas at all). Thus, it would be desirable to produce foams having both low density and very small cells, e.g. $\leq 100$ μm. Such foams apparently cannot be produced by state-of-the-art blown foam processes.

The historical approach to making insulating foams for the appliance industry (e.g. refrigerators, water heaters), etc. has been to use chlorofluorocarbons (CFCs) as physical inflating agents, especially for foams based on polyurethane and polyisocyanate starting materials. The reported association between CFCs and ozone layer depletion has sharply curtailed their production and increased the need for alternate materials and/or methods for making foams. Alternate blowing agents such as carbon dioxide and pentane however develop less efficient insulating foams relative to those made with CFCs. This results from the difficulty in achieving the same fineness of microstructure and densities possible with CFC blown foams. See for examples Moore, S. E. *J. Cell. Plastics* 1994, 30, 494 and U.S. Pat. No. 5,034,424 (Wenning et al.), issued Jul. 23, 1991. See also Oertel, p 273; Gibson and Ashby, Chapter 7, p 201.

Polyurethane foams are perhaps the most broadly used type in such applications. The chemistry used in processing presents certain disadvantages including poor photostability (see Valentine, C.; Craig, T. A; Hager, S. L. *J. Cell. Plastics* 1993, 29, 569), the inevitable existence of undesirable chemical residues in the foams (see U.S. Pat. No. 4,211,847 to Kehr et al., issued Jul. 8, 1980, and U.S. Pat. No. 4,439,553 to Guthrie et al., issued Mar. 27, 1984, describing efforts to minimize these residues), and the production of noxious gases developed during burning owing to the presence of nitrogen atoms within the composition (see Hartzell, G. E. *J. Cell. Plastics* 1992, 28, 330). This can be particularly problematic in accidents involving public conveyances such as boats, automobiles, trains, or airplanes which may catch fire. Injuries and fatalities may result solely from inhalation of these noxious gases. See Gibson and Ashby Chapter 8, p 212. This can also be an issue when the foam is discarded into a waste stream that is to be incinerated.

The building insulation industry has widely used foamed polystyrene rigid panels (in addition to glass batting and blown cellulose insulation). Styrene foam panels are useful in that they are rigid and may be nailed during construction, are hydrophobic to provide moisture resistance (which otherwise diminishes insulation value), and are relatively inexpensive. See Oertel p 277. This material is also widely used in beverage cups and food containers. The cell sizes of these materials are typically in the 300–500 μm range. Smaller celled polystyrene foams have been prepared using the Thermally Induced Phase Separation Process (TIPS)

described in *Chemtech* 1991, 290 and U.S. Pat. No. 5,128,382 (Elliott, et al.) issued Jul. 7, 1992, which is herein incorporated by reference.

In some insulating applications, it is desirable to deliver the insulation in roll form for ease of application, as in, for example, the insulation of attics in houses. The more compact such a roll can be, the more convenient it is to apply, cany, and store. Compactness in packaging and reduced weight also results in reduced distribution costs for the manufacturer and distributor, including less shelf space required in the store per insulating roll unit.

The desire for thinner insulating materials is opposed to the requirement to maintain a thick layer of entrapped air so as to provide efficient insulation. One approach to avoiding this dilemma is to provide a material in a compressed state that will gradually reexpand after application. An example is the product Miraflex™ recently marketed by Owens-Corning Corp. which is shipped and used at about half the thickness to which it will ultimately expand (*Chem. Mkt. Rep.* Oct. 3, 1994, 15).

Foams which can be delivered in a compressed state and then expanded at the point of use are known. U.S. Pat. No. 5,387,207 (Dyer et al.) issued Feb. 7, 1995 discloses relatively thin polymeric foams materials that expand upon contact with aqueous body fluids. However, these foams do not expand when heated or otherwise activated in a manner that would be useful for insulation materials. U.S. Pat. No. 4,788,225 (Edwards et al.) issued Nov. 29, 1988 discloses foams which exhibit an elastic return from 50% compression to 90% of initial thickness in less than 120 seconds. Such foams would not function usefully as desired for foams of the present invention in that they would reexpand too quickly and not stay thin during any length of storage. Furthermore, the expandable foams are not recognized as useful for insulation applications. Preferably, compressed foams of the present invention would stay thin for a lengthy storage period and reexpand fairly rapidly after application at the point of use so as to restore their full insulating capacity. Such reexpansion is initiated by, for example, heat, since no water would be present in most instances.

An important issue in making insulating foams commercially attractive as insulators is economics. The economics of foams depend on the amount and cost of the monomers used, as well as the cost of converting the monomers to a usable polymeric foam. The effort to reduce the cost of such insulating foams, especially in terms of reducing the total amount of monomer used, can make it very difficult to achieve the desired insulation and mechanical properties. As indicated above, another important factor affecting the economics of insulation are the costs associated with shipping the materials for end uses.

Accordingly, it would be desirable to be able to make an open-celled insulating polymeric foam material that: (1) has adequate rigidity or flexibility according to the requirements of use; (2) can be made with relatively small cell sizes to limit thermal conductivity contributed by radiation; (3) can be made without chlorofluorocarbons or other gases which may induce undesired environmental problems; (4) can be made and delivered in a compressed or thin state prior to use and expanded after application; (5) contains no nitrogen chemically bound in the structure that, upon combustion, may release toxic gases; and (6) can be manufactured economically without sacrificing the desired insulating and mechanical properties to an unacceptable degree.

SUMMARY OF THE INVENTION

The present invention relates to compressable polymeric foam materials useful as insulation. These polymeric foams are prepared by polymerization of certain water-in-oil emulsions having a relatively high ratio of water phase to oil phase, commonly known in the art as "HIPEs." As used herein, polymeric foam materials which result from the polymerization of such emulsions are referred to hereafter as "HIPE foams." These polymeric foam materials comprise a generally hydrophobic, flexible or semi-flexible, nonionic polymeric foam structure of interconnected open-cells. The foam structures of the present invention have:

(a) a specific surface area per foam volume of at least about 0.01 $m^2/cc$;

(b) an expanded density of less than about 0.05 g/cc; and (c) a ratio of expanded to compressed thickness of at least about 3:1;

wherein when the foam is compressed to 33% of its original expanded thickness and is thereafter maintained without artificial restraint on its surface, said foam will reexpand by no more than 50% after 21 days at ambient temperature (22° C.).

Preferably, the foams of the present invention, when heated to their Tg or higher, will reexpand to 90% of their original thickness within about 1 day or less.

The present invention provides low density, compressible insulating foams prepared via polymerization of a HIPE comprising a discontinuous water phase and a continuous oil phase, wherein the ratio of water-to-oil is at least about 20:1. The water phase generally contains an electrolyte and a water soluble initiator. The oil phase generally consists of substantially water-insoluble monomers polymerizeable by free radicals, an emulsifier, and other optional ingredients defined below. The monomers are selected so as to confer the properties desired in the resulting polymeric foam, e.g. mechanical integrity sufficient for the end use, and economy. Preferably, the glass transition temperature (Tg) of the resulting foam will be between about 30° and 90° C.

The invention further relates to a process for obtaining these low density, compressible foams by polymerizing a specific water-in-oil emulsion or HIPE having a relatively small amount of an oil phase and a relatively greater amount of a water phase. This process comprises the steps of:

A) forming a water-in-oil emulsion from:

(1) an oil phase comprising:
  (a) from about 80% to about 98% by weight of a monomer component capable of forming a copolymer having a Tg value of from about 30° C. to about 90° C., said monomer component comprising:
    (i) from about 20% to about 45% by weight of a substantially water-insoluble, monofunctional monomer capable of forming a homopolymer having a Tg of about 35° C. or less;
    (ii) from about 20% to about 50% by weight of a substantially water-insoluble, monofunctional comonomer capable of imparting toughness about equivalent to that provided by styrene;
    (iii) from about 2% to about 50% of a first substantially water-insoluble, polyfunctional crosslinking agent selected from the group consisting of divinyl benzene and analogs thereof, and
    (iv) from about 0% to about 15% of a second substantially water-insoluble, polyfunctional crosslinking agent selected from the group consisting of diacrylates of diols and analogs thereof, and
  (b) from about 2% to about 20% by weight of an emulsifier component which is soluble in the oil phase and which is suitable for forming a stable water-in-oil emulsion;

(2) a water phase comprising from about 0% to about 20% by weight of a water-soluble electrolyte; and (3) a volume to weight ratio of water phase to oil phase in the range of from about 20:1 to about 250:1; and B) polymerizing the monomer component in the oil phase of the water-in-oil emulsion to form a polymeric foam material having:

(1) a specific surface area per foam volume of at least about 0.025 m²/cc;

(2) an expanded density of less than about 0.05 g/cc; and (3) a ratio of expanded to compressed thickness of at least about 3:1;

wherein when the foam is compressed to 33% of its original expanded thickness and is thereafter maintained without artificial restraint on its surface, said foam will reexpand by no more than 50% after 21 days at 22° C.

Preferably, this foam, when heated to its Tg or higher, will then reexpand to 90% of its original thickness within about 1 day or less.

The polymeric foam material can subsequently be iteratively washed and dewatered to provide a dry, hydrophobic foam that may be shaped as desired. Typically, this shaping will comprise slicing into sheets. These sheets may be compressed, e.g. continuously through pressure nips, into a thin state and wound into rolls. These sheets will retain their relatively thin compressed state until unwound, applied as desired, and either heated above their activation temperature (usually about the Tg of the polymer) or allowed to stand for a relatively long period of time, e.g. several weeks, months, or years, depending on the ambient temperature and any confining forces which may be present (as from packaging).

DETAILED DESCRIPTION OF THE INVENTION

I. Compressible Insulating Polymeric Foam

A. General Foam Characteristics

Polymeric foams according to the present invention are relatively open-celled. This means the individual cells of the foam are in complete, unobstructed communication with adjoining cells. The cells in such substantially open-celled foam structures have intercellular openings or "windows" connecting one cell to the other within the foam structure.

These substantially open-celled foam structures will generally have a reticulated character with the individual cells being defined by a plurality of mutually connected, three dimensionally branched webs. The strands of polymeric material making up these branched webs can be referred to as "struts." Open-celled foams having a typical strut-type structure are shown by way of example in the photomicrographs of FIG. 1. For purposes of the present invention, a foam material is "open-celled" if at least 80% of the cells in the foam structure that are at least 1 µm in size are in open communication with at least one adjacent cell.

In addition to being open-celled, these polymeric foams are generally hydrophobic to inhibit the passage of aqueous fluids through the foam. The internal surfaces of the foam structures are rendered hydrophobic by removal or neutralization of hydrophilizing surfactants and salts left in the foam structure after polymerization.

The foams of the present invention are readily optimized so as to confer the properties desired in each specific application. The ease of control over a wide range of properties of these foams is believed to be unobtainable using the processes for obtaining known foam insulation materials. As examples, these foams may be microcellular (<10 µm) up through medium cell diameters (ca. 80 µm); low density (0.05 g/cc) to very low density (0.005 g/cc); rigid to flexible (corresponding, high Tg to low (subambient) Tg); and strong to weak. The foams may be provided as continuous sheets, rigid thick boards, particulates of various sizes, specific shapes, etc. as required. However optimized, these foams avoid some of the deficiencies associated with the foam methods described hereinabove. That is, they preferably contain no nitrogen so that burning produces no unusually noxious gases, require no CFC/volatile organic compounds ("VOC") materials during manufacture, are producible readily in large quantities with reasonable economics as either slabstock, roll stock, particulate foam, and the like. Further, the foams of the present invention are inherently photostable. A significant advantage of the foams of the present invention is the ability to be prepared, packaged, and shipped in a compressed, high density state and to "spring back" upon activation to the original density of the foam. This is particularly useful with regard to building insulation, wherein rolled batts of insulation are shipped to widely dispersed locations and the full volume of the to transporting vehicle may be filled well before the weight limit of the vehicle is approached.

The recoverable compressed storage of the foams of the current invention may be achieved by any of several means. It has been discovered that these foams can be made in such a way that the removal of water in the finishing stages of the process (described below in more detail) results in a naturally thin foam structure which can readily be rolled up, preferably after laminating to a carrier sheet such as thick reinforced paper. Upon release from this stored state, the foam will either slowly expand to its original thickness (and insulating capacity) or be expanded quickly by application of a small amount of heat. This expansion property is developed only when the strength/density, Tg, and crosslink density of the foam is suitably matched with the cellular microstructure of the foam as described below. The unique feature of these foams is the ability to survive during shipping and storage in the thin state (often shrink wrapped to control the modest tendency to preexpand) and recover not only the original design density but also the mechanical properties such as strength and resilience. This can only be achieved with thermoset, or crosslinked, foams which will not permanently creep under storage. See U.S. Pat. No. 3,903,232 (Wood et al.) Sep. 2, 1975, incorporated herein by reference.

B. Glass Transition Temperature

A key parameter of the present compressible foams is their glass transition temperature (Tg). The Tg represents the midpoint of the transition between the glassy and rubbery states of the polymer. Foams that have a Tg higher than the temperature of use can be very strong but will also be very rigid and potentially prone to fracture. Such foams also typically take a long time to recover to the expanded state after having been stored in the compressed state for prolonged periods. Those skilled in the art will recognize that the desired combination of mechanical properties, specifically strength and resilience, will necessitate routine selection between a range of monomer types and levels to achieve the desired end properties.

The compressed state is maintained by keeping the polymeric foam substantially below the Tg of the polymer. In this state, the flow of the individual polymer chains is relatively slow. However, the thermoset characteristic of these foams (deriving from a relatively high level of crosslinker incorporated therein), provides memory of the prexisting expanded state. Thus, when warmed or allowed to stand under no load, the foams will recover their original dimensions (rapidly if heated significantly above their Tg). These dimensions provide for the low density inherent in providing a useful insulating material. This attribute is particularly useful wherein the foam is to be shipped, stored, and applied in roll form to cover a comparatively large area such as an attic of a dwelling. During these steps it occupies considerably less bulk than is characteristic of fiberglass batting, for example. During or after application, either heat and/or the passage of time will restore the foam's original dimensions and insulating ability. The Tg of the polymeric foam is obviously important to maintaining stability in the compressed state and still provide for reexpansion within a reasonable period or at achievable temperatures. Though the end use of a particular foam is an important factor when determining the desired Tg of the foam, preferred are foams having a Tg of from about 30° to about 70° C. More preferred are foams having a Tg of from about 30° to about 50° C.

C. Foam Density

Another important property of the insulating foams of the present invention is their density. "Foam density" (i.e., in grams of foam per cubic centimeter of foam volume in air) is specified herein on a dry basis. Any suitable gravimetric procedure that will provide a determination of mass of solid foam material per unit volume of foam structure can be used to measure foam density. For example, an ASTM gravimetric procedure described more fully in the TEST METHODS section of U.S. Pat. No. 5,387,207 (Dyer et al), issued Feb. 7, 1995 (herein incorporated by reference) is one method that can be employed for density determination. In its compressed state, polymeric foams of the present invention useful as insulating materials have dry basis density values in the range of from about 0.05 to about 0.3 g/cc, preferably from about 0.10 to about 0.15 g/cc, and most preferably about 0.10 g/cc. In its expanded state, polymeric foams of the present invention useful as insulators have dry basis density values in the range of from about 0.05 to about 0.006 g/cc, preferably from about 0.04 to about 0.008 g/cc, and most preferably from about 0.03 to about 0.015 g/cc.

D. Expansion Factor

Upon exposure to heat or the passage of time, the compressed foams of the present invention regain their original dimensions and shape. This is attributable to the thermoset nature of the polymer used to make the foam. Generally, the foams are compressed in one dimension, called the "z-direction", which is the thinnest dimension of a sliced sheet of foam. Upon recovery of the original expanded dimensions of the foam, an "expansion factor" can be defined which relates the ratio of the thinnest dimension in the expanded versus the compressed state. For the foams of this invention, the expansion factor is at least about 3×, i.e. the thickness of the foam in its expanded state is at least about 3 times the thickness of the foam in its compressed state. The compressed foams of the present invention typically have an expansion factor in the range of from about 3× to about 10×. By comparison, prior compressed fiberglass batting foams typically have a recoverable expansion factor of only about 2×.

The procedure for measuring the expansion factor is described hereafter in the TEST METHODS section.

When a foam of the present invention is compressed to 30% of its original thickness and is thereafter maintained without artificial restraint on its surface, said foam will reexpand by no more than 50% after 21 days at ambient temperature (22° C). Preferably, this foam, when heated to its Tg or higher, will then reexpand to 90% of its original thickness within about 1 day or less.

E. Resistance to Compression Deflection

A mechanical feature of the insulating polymeric foams of the present invention is their strength in their expanded state, as determined by its resistance to compression deflection (LTCD). The RTCD exhibited by the foams herein is a function of the polymer modulus, as well as the density and structure of the foam network. The polymer modulus is, in turn, determined by: a) the polymer composition; b) the conditions under which the foam is polymerized (for example, the completeness of polymerization obtained, specifically with respect to crosslinking); and c) the extent to which the polymer is plasticized by residual material e.g., emulsifiers, left in the foam structure after processing. Foams of the present invention will exhibit RTCD over a broad range depending on the material properties desired. Typically, this range will include 2% to 90% RTCD and will preferably between about 10% and about 50%.

F. Cell Diameter

Foam cells, and especially cells that are formed by polymerizing a monomer-containing oil phase that surrounds relatively monomer-free water-phase droplets, will frequently be substantially spherical in shape. The size or "diameter" of such spherical cells is a commonly used parameter for characterizing foams in general. Since cells in a given sample of polymeric foam will not necessarily be of approximately the same size, an average cell size, i.e., average cell diameter, will often be specified.

Figure 1:
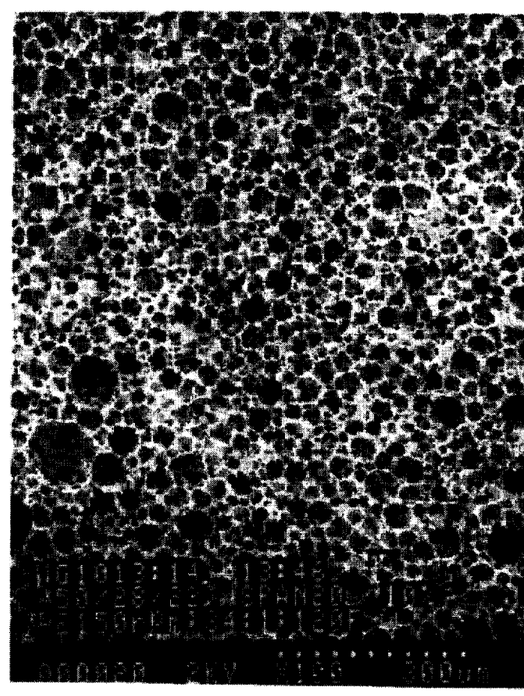
FIG. 1 of the drawings is a photomicrograph (100× magnification) of a view of a cut section of a representative polymeric foam according to the present invention in its expanded state made from HIPE having a 34:1 water to oil ratio poured at 35° C. and where the monomer component consisted of a 28:22:50 weight ratio of styrene:technical grade divinyl benzene (about 55% DVB and about 45% ethyl styrene):2-ethylhexyl acrylate, and where 12% (by weight of the oil phase) of Span 20™ (nominal sorbitan monolaurate) emulsifier was used.

A number of techniques are available for determining the average cell size of foams. The most useful technique, however, for determining cell size in foams involves a simple measurement based on the scanning electron photomicrograph of a foam sample. FIG. 1, for example, shows a typical HEPE foam structure according to the present invention in its expanded state. Superimposed on the photomicrograph is a scale representing a dimension of 300 µm. Such a scale can be used to determine average cell size via an image analysis procedure.

The cell size measurements given herein are based on the number average cell size of the foam in its expanded state, e.g., as shown in FIG. 1. The foams useful as insulation materials in accordance with the present invention will preferably have a number average cell size of less than about 100 µm, preferably from about 5 µm to about 80 µm, more preferably from about 10 µm to about 50 µm. Most preferably, the average cell diameters will be about 15 µm to about 35 µm for best insulating and thinness properties. Foams that are of smaller cell sizes will tend to be slower to recover to their original dimensions after application due to the interstitial residual water that applies capillary forces which resist reexpansion.

G. Foam Thickness

The foams of the present invention may be sliced as desired. Preferably, the thickness of these slices will be between about 0.2 cm to about 8.9 cm, more preferably from about 1 cm and about 5 cm. Thicker slices become more difficult to dewater at normal processing speeds. Also, even after compression, slices that are too thick will be resistant to being rolled up as desired for easy shipment, storage, and application. In principal, though, any thickness slices may be obtained. For thicker slices, it may be preferable to pass through successive dewatering nip rolls with gradually decreasing spacing so as not to fracture the foam slice by too rapid complete pressure dewatering.

H. Thermal Insulation

The thermal insulating properties of a material are measured by standard test procedures well known to those skilled in the art, such as ASTM C177-85 used herein.

I. Specific Surface Area

Another key parameter of the foams is their specific surface area, which is determined by both the dimensions of the cellular units in the foam and by the density of the polymer, and is thus a way of quantifying the total amount of solid surface provided by the foam.

Specific surface area is determined by measuring the amount of capillary uptake of a low surface tension liquid (e.g., ethanol) which occurs within a foam sample of known mass and dimensions. A detailed description of such a procedure for determining foam specific surface area via the capillary suction method is set forth in the TEST METHODS section of U.S. Pat. No. 5,387,207 (Dyer et al.), issued Feb. 1, 1995, which is incorporated herein by reference. Other similar tests for determining specific surface area can be used with the present insulation foams.

II. Preparation of Polymeric Foams From HIPE Having Relatively High Water-to-Oil Ratios

A. In General

Polymeric foams according to the present invention are prepared by polymerization of HIPEs. The relative amounts of the water and oil phases used to form the HIPEs are, among many other parameters, important in determining the structural, mechanical and performance properties of the resulting polymeric foams. In particular, the ratio of water to oil in the emulsion can influence the density, cell size, and capillary suction specific surface area of the foam and dimensions of the struts that form the foam. The emulsions used to prepare the HIPE foams of the present invention will generally have a volume to weight ratio of water phase to oil phase in the range of from about 20:1 to about 250:1, more preferably from about 25:1 to about 75:1, most preferably from about 30:1 to about 65:1.

1. Oil Phase Components

The continuous oil phase of the HIPE comprises monomers that are porymerized to form the solid foam structure. This monomer component is formulated to be capable of forming a copolymer having a Tg of from about 40° to about 90° C., and typically from about 50° to about 70° C. (The method for determining Tg by Dynamic Mechanical Analysis (DMA) is described in the TEST METHODS section of U.S. Pat. No. 5,387,207, which is incorporated by reference herein.) This monomer component includes: (a) at least one monofunctional monomer whose atactic amorphous polymer has a Tg of about 35° C. or lower (see Brandup, J.; Immergut, E. H. "Polymer Handbook", 2nd Ed., Wiley-Interscience, New York, N.Y., 1975, III-139); (b) at least one monofunctional comonomer to improve the toughness or tear resistance of the foam; (c) a first polyfunctional crosslinking agent; and (d) optionally a second polyfunctional crosslinking agent. Selection of particular types and amounts of monofunctional monomer(s) and comonomer(s) and polyfunctional cross-linking agent(s) can be important to the realization of HIPE foams having the desired combination of structure, and mechanical properties which render such materials suitable for use in the invention herein.

The monomer component comprises one or more monomers that tend to impart rubber-like properties to the resulting polymeric foam structure. Such monomers can produce high molecular weight (greater than 10,000) atactic amorphous homopolymers having Tgs of about 35° C. or lower. Monomers of this type include, for example, the $C_4$–$C_{14}$ alkyl acrylates such as butyl acrylate, hexyl acrylate, octyl acrylate, 2-ethylhexyl acrylate, nonyl acrylate, decyl acrylate, dodecyl (lauryl) acrylate, isodecyl acrylate, and tetradecyl acrylate; aryl and alkaryl acrylates such as benzyl acrylate and nonylphenyl acrylate; the $C_6$–$C_{16}$ alkyl methacrylates such as hexyl methacrylate, octyl methacrylate, nonyl methacrylate, decyl methacrylate, isodecyl methacrylate, dodecyl (lauryl) methacrylate, and tetradecyl methacrylate; acrylamides such as N-octadecyl acrylamide; $C_4$–$C_{12}$ alkyl styrenes such as p-n-octylstyrene; and combinations of such monomers. Of these monomers, isodecyl acrylate, dodecyl acrylate and 2-ethylhexyl acrylate are the most preferred. The monofunctional monomer(s) will generally comprise 20 to about 45%, more preferably from about 25 to about 40%, by weight of the monomer component.

The monomer component utilized in the oil phase of the HIPEs also comprises one or more monofunctional comonomers capable of imparting toughness about equivalent to that provided by styrene to the resulting polymeric foam structure. Tougher foams exhibit the ability to deform substantially without failure. These monofunctional comonomer types can include styrene-based comonomers (e.g., styrene and ethyl styrene) or other monomer types such as methyl methacrylate where the related homopolymer is well known as exemplifying toughness. The preferred monofunctional comonomer of this type is a styrene-based monomer with styrene and ethyl styrene being the most preferred monomers of this kind. The monofunctional "toughening" comonomer will normally comprise from about 10 to about 70%, preferably from about 20% to about 50%, most preferably from about 30% to about 40%, by weight of the monomer component.

In certain cases, the "toughening" comonomer can also impart the desired rubber-like properties to the resultant polymer. The $C_4$–$C_{12}$ alkyl styrenes, and in particular p-n-octylstyrene, are examples of such comonomers. For such comonomers, the amount that can be included in the monomer component will be that of the typical monomer and comonomer combined.

The monomer component also contains a first (and optionally second) polyfunctional crosslinking agent. As with the monofunctional monomers and comonomers, selection of the particular type and amount of crosslinking agents is very important to the eventual realization of preferred polymeric foams having the desired combination of structural and mechanical properties.

The first polyfunctional crosslinking agent can be selected from a wide variety of monomers containing two or more activated vinyl groups, such as divinylbenzenes and analogs thereof. Analogs of divinylbenzenes useful herein include, but are not limited to, trivinyl benzenes, divinyltoluenes, divinylxylenes, divinylnaphthalenes divinylalkylbenzenes, divinylphenanthrenes, divinylbiphenyls, divinyldiphenylmethanes, divinylbenzyls, divinylphenylethers, divinyldiphenylsulfides, divinyifurans, divinylsulfide, divinylsulfone, and mixtures thereof. Divinylbenzene is typically available as a mixture with ethyl styrene in proportions of about 55:45. These proportions can be modified so as to enrich the oil phase with one or the other component. Generally, it is advantageous to enrich the mixture with the ethyl styrene component while simultaneously reducing the amount of styrene in the monomer blend. The preferred ratio of divinylbenzene to ethyl styrene is from about 30:70 to 55:45, most preferably from about 35:65 to about 45:55. The inclusion of higher levels of ethyl styrene imparts the required toughness without increasing the Tg of the resulting copolymer to the degree that styrene does. This first cross-linking agent can generally be included in the oil phase of the HIPE in an amount of from about 2 to about 50%, more preferably from about 5 to about 35%, most preferably from about 10% to about 20%, by weight of the monomer component (100% basis).

The optional second crosslinking agent is selected from the group consisting of diacrylates of diols and analogs thereof. Such crosslinking agents include those selected from polyfunctional acrylates, methacrylates, acrylamides, methacrylamides, and mixtures thereof. These include di-, tri-, and tetra-acrylates, as well as di-, tri-, and tetra-methacrylates, di-, tri-, and tetra-acrylamides, as well as di-, tri-, and tetra-methacrylamides; and mixtures of these crosslinking agents. Suitable acrylate and methacrylate crosslinking agents can be derived from diols, triols and tetraols that include 1,10-decanediol, 1,8-octanediol, 1,6-hexanediol, 1,4-butanediol, 1,3-butanediol, 1,4-but-2-enediol, ethylene glycol, diethylene glycol, trimethylolpropane, pentaerythritol, hydroquinone, catechol, resorcinol, triethylene glycol, polyethylene glycol, sorbitol and the like. (The acrylamide and methacrylamide crosslinking agents can be derived from the equivalent diamines, triamines and tetramines). The preferred diols have at least 2, more preferably at least 4, most preferably 6, carbon atoms. This second cross-linking agent can generally be included in the oil phase of the HIPE in an amount of from 0 to about 15% by weight of the monomer component.

The major portion of the oil phase of the HIPEs will comprise the aforementioned monomers, comonomers and crosslinking agents. It is essential that these monomers, comonomers and crosslinking agents be substantially water-insoluble so that they are primarily soluble in the oil phase and not the water phase. Use of such substantially water-insoluble monomers ensures that HPEs of appropriate characteristics and stability will be realized. It is, of course, highly preferred that the monomers, comonomers and crosslinking agents used herein be of the type such that the resulting polymeric foam is suitably non-toxic and appropriately chemically stable. These monomers, comonomers and cross-linking agents should preferably have little or no toxicity if present at very low residual concentrations during post-polymerization foam processing and/or use.

Another essential component of the oil phase of the HIPE is an emulsifier component that comprises at least a primary emulsifier. Suitable primary emulsifiers well known to those skilled in the art. Particularly preferred emulsifiers include Span 20™, Span 40™, Span 60™, and Span 80™. These are nominally esters of sorbitan based on derived from lauric, myristic, stearic, and oleic acids, respectively. Other preferred emulsifiers include the diglycerol esters derived from monooleate, monomyristate, monopalmitate, and monoisostearate acids. A preferred coemulsifier is ditallowdimethyl ammonium methyl sulfate. Mixtures of these emulsifiers are also particularly useful, as are purified versions of each, specifically sorbitan esters containing minimal isosorbide and polyol impurities.

In addition to these primary emulsifiers, secondary emulsifiers can be optionally included in the emulsifier component. These secondary emulsifiers can be obtained commercially or prepared using methods known in the art. The preferred secondary emulsifiers are ditallow dimethyl ammonium methyl sulfate and ditallow dimethyl ammonium methyl chloride. When these optional secondary emulsifiers are included in the emulsifier component, it is typically at a weight ratio of primary to secondary emulsifier of from about 50:1 to about 1:4, preferably from about 30:1 to about 2:1.

As is indicated, those skilled in the art will recognize that any suitable emulsifier(s) can be used in the processes for making the foams of the present invention. For example, see U.S. Pat. No. 5,387,207 and copending U.S. application Ser. No. 08/370,695, filed Jan. 10, 1995 by Stone et al.

The oil phase used to form the HIPEs comprises from about 80 to about 98% by weight monomer component and from about 2 to about 20% by weight emulsifier component. Preferably, the oil phase will comprise from about 90 to about 97% by weight monomer component and from about 3 to about 10% by weight emulsifier component. The oil phase also can contain other optional components. One such optional component is an oil soluble polymerization initiator of the general type well known to those skilled in the art, such as described in U.S. Pat. No. 5,290,820 (Bass et al), issued Mar. 1, 1994, which is incorporated by reference.

A preferred optional component is an antioxidant such as a Hindered Amine Light Stabilizer (HALS) such as bis-(1,2,2,5,5-pentamethylpiperidinyl) sebacate (Tinuvin-765®) or a Hindered Phenolic Stabilizer (HPS) such as Irganox-1076® and t-butylhydroxyquinone. Another preferred optional component is a plasticizer such as dioctyl azelate, dioctyl sebacate or dioctyl adipate. Yet another optional ingredient is filler particles which may toughen the polymer and/or increase its thermal insulating properties. Example filler particles include aluminum, titanium dioxide, carbon black, graphite, calcium carbonate, talc, and the like. Generally, particles which help make the polymer opaque in the infrared region are preferred, such as carbon black and graphite. Other optional components include colorants, fluorescent agents, opacifying agents, chain transfer agents, and the like.

2. Water Phase Components

The discontinuous water internal phase of the HIPE is generally an aqueous solution containing one or more dissolved components. One essential dissolved component of the water phase is a water-soluble electrolyte. The dissolved electrolyte minimizes the tendency of monomers, comonomers, and crosslinkers that are primarily oil soluble to also dissolve in the water phase. This, in turn, is believed to minimize the extent to which polymeric material fills the cell windows at the oil/water interfaces formed by the water phase droplets during polymerization. Thus, the presence of electrolyte and the resulting ionic strength of the water phase is believed to determine whether and to what degree the resulting preferred polymeric foams can be open-celled.

Any electrolyte capable of imparting ionic strength to the water phase can be used. Preferred electrolytes are mono-, di-, or trivalent inorganic salts such as the water-soluble halides, e.g., chlorides, nitrates and sulfates of alkali metals and alkaline earth metals. Examples include sodium chloride, calcium chloride, sodium sulfate and magnesium sulfate. Calcium chloride is the most preferred for use in the present invention. Generally the electrolyte will be utilized in the water phase of the HIPEs in a concentration in the range of from about 0.2 to about 20% by weight of the water phase. More preferably, the electrolyte will comprise from about 1 to about 10% by weight of the water phase.

The HIPEs will also typically contain an effective amount of a polymerization initiator. Such an initiator component is generally added to the water phase of the HIPEs and can be any conventional water-soluble free radical initiator. These include peroxygen compounds such as sodium, potassium and ammonium persulfates, hydrogen peroxide, sodium peracetate, sodium percarbonate and the like. Conventional redox initiator systems can also be used. Such systems are formed by combining the foregoing peroxygen compounds with reducing agents such as sodium bisulfite, L-ascorbic acid or ferrous salts.

The initiator can be present at- up to about 20 mole percent based on he total moles of polymerizable monomers present in the oil phase. More preferably, the initiator is present in an amount of from about 0.001 to about 10 mole percent based on the total moles of polymerizable monomers in the oil phase.

3. Hydrophilizing Surfactants and Hydratable Salts

The polymer forming the HIPE foam structure will preferably be substantially free of polar functional groups. This means the polymeric foam will be relatively hydrophobic in character. When these foams are to be used as insulating materials, resistance to water is generally a desired feature. Removal of the residual emulsifier and/or salt following polymerization is generally desired in a manner described more fully hereafter.

B. Processing Conditions for Obtaining HIPE Foams

Foam preparation typically involves the steps of: 1) forming a stable high internal phase emulsion (HIPE); 2) polymerizing/curing this stable is emulsion under conditions suitable for forming a solid polymeric foam structure; 3) optionally washing the solid polymeric foam structure to remove the original residual water phase, emulsifier, and salts from the polymeric foam structure, and 4) thereafter dewatering this polymeric foam structure.

1. Formation of HIPE

The HIPE is formed by combining the oil and water phase components in the previously specified ratios. The oil phase will typically contain the requisite monomers, comonomers, crosslinkers, and emulsifiers, as well as optional components such as plasticizers, fillers, antioxidants, flame retardants, and chain transfer agents. The water phase will typically contain electrolytes and polymerization initiators.

The HIPE can be formed from the combined oil and water phases by subjecting these combined phases to shear agitation. Shear agitation is generally applied to the extent and for a time period necessary to form a stable emulsion. Such a process can be conducted in either batchwise or continuous fashion and is generally carried out under conditions suitable for forming an emulsion where the water phase droplets are dispersed to such an extent that the resulting polymeric foam will have the requisite structural characteristics. Emulsification of the oil and water phase combination will frequently involve the use of a mixing or agitation device such as a pin impeller.

One preferred method of forming HIPE involves a continuous process that combines and emulsifies the requisite oil and water phases. In such a process, a liquid stream comprising the oil phase is formed. Concurrently, a separate liquid stream comprising the water phase is also formed. The two separate streams are then combined in a suitable mixing chamber or zone such that the requisite water to oil phase weight ratios previously specified are achieved.

In the mixing chamber or zone, the combined streams are generally subjected to shear agitation provided, for example, by a pin impeller of suitable configuration and dimensions. Shear will typically be applied to the combined oil/water phase stream at an appropriate rate. Once formed, the stable liquid HIPE can then be withdrawn from the mixing chamber or zone. This preferred method for forming HIPEs via a continuous process is described in greater detail in U.S. Pat. No. 5,149,720 (DesMarais et al), issued Sep. 22, 1992, which is incorporated by reference. See also copending U.S. application Ser. No. 08/370,694, filed Jan. 10, 1995 by T. DesMarais (herein incorporated by reference), which describes an improved continuous process having a recirculation loop for the HIPE.

2. Polymerization/Curing of the HIPE

The HIPE formed will generally be collected or poured in a suitable reaction vessel, container or region to be polymerized or cured. In one embodiment, the reaction vessel comprises a tub constructed of polyethylene from which the eventually polymerized/cured solid foam material can be easily removed for further processing after polymerization/curing has been carried out to the extent desired. The temperature at which the HIPE is poured into the vessel is preferably approximately the same as the polymerization/curing temperature.

Suitable polymerization/curing conditions will vary depending upon the monomer and other makeup of the oil and water phases of the emulsion (especially the emulsifier systems used), and the type and amounts of polymerization initiators used. Frequently, however, suitable polymerization/curing conditions will involve maintaining the HIPE at elevated temperatures above about 30° C., more preferably above about 35° C., for a time period ranging from about 2 to about 64 hours, more preferably from about 4 to about 48 hours. The HIPE can also be cured in stages such as described in U.S. Pat. No. 5,189,070 (Brownscombe et al), issued Feb. 23, 1993, which is herein incorporated by reference.

A porous water-filled open-celled HIPE foam is typically obtained after polymerization/curing in a reaction vessel, such as a tub. This polymerized HIPE foam is typically cut or sliced into a sheet-like form. Sheets of polymerized HIPE foam are easier to process during subsequent treating/washing and dewatering steps, as well as to prepare the HIPE foam for use as insulating materials. The polymerized HIPE foam is typically cut/sliced to provide a cut thickness in the range of from about 0.08 to about 6.0 cm.

3. Treating/Washing HIPE Foam

The polymerized HIPE foam formed will generally be filled with residual water phase material used to prepare the HIPE. This residual water phase material (generally an aqueous solution of electrolyte, residual emulsifier, and polymerization initiator) should be at least partially removed prior to further processing and use of the foam. Removal of this original water phase material will usually be carried out by compressing the foam structure to squeeze out residual liquid and/or by washing the foam structure with water or other aqueous washing solutions. Frequently several compressing and washing steps, e.g., from 2 to 4 cycles, can be used. It is preferable that the water used in these washing be heated to at least about the Tg of the polymer so as to maintain its flexibility and compliance during compressive dewatering and reduce and prevent damage to the foam structure. Optionally, the wash water may comprise about 1% sodium bicarbonate solution so as to convert any small amounts of residual calcium chloride to the nonhygroscopic calcium carbonate, thus rendering the foam substantially non-wettable.

4. Foam Dewatering

After the HIPE foam has been treated/washed, it will generally be dewatered. Dewatering can be achieved by compressing the foam to squeeze out residual water, by subjecting the foam, or the water therein to temperatures of from about 60° to about 200° C. or to microwave treatment, by vacuum dewatering or by a combination of compression and thermal drying/microwave/vacuum dewatering techniques. These HIPE foams are typically compressively dewatered to a thickness of about ⅓ (33%) or less of their fully expanded thickness. Preferably, the foams will be compressively dewatered to a thickness of about 20% or less of their fully expanded thickness. The extent to which the foam can be compressed depends on the density of the foam in the expanded state and the Tg of the foam in relation to the temperature of the foam during the compression process. The dewatering step will generally be carried out until the HIPE foam is ready for use and is as dry as practicable. Frequently such compression dewatered foams will have a water (moisture) content as low as possible, from about 1% to about 15%, more preferably from about 5% to about 10%, by weight on a dry weight basis.

III. Uses of Polymeric Foams

A. In General

Polymeric foams according to the present invention are broadly useful as insulating materials. These foams can also be employed as insulators against acoustic or mechanical forces.

These polymeric foams can be provided as relatively thin and flexible continuous sheets which may be rolled up. The foams of this invention may be laminated or bonded to other support media to provide stiffness, strength, or better insulating properties. For example, a thin sheet of reflective foil can be laminated on one or both sides of the foam slab so as to reduce further radiative heat transfer through the structure.

B. Insulating Articles

Polymeric foams of the present invention are particularly useful in a variety of applications including appliances (refrigerators, ovens, ranges, toasters, freezers), transportation equipment (cars, trains, planes, boats), buildings (wall insulation, attic insulation), and for many other uses. The preferred embodiment comprises a continuous slice of said foam compressed to at least about one-third the thickness of its thinnest dimension, stored, shipped, and applied as a roll stock item, and expanded after application by either time and/or heat to restore the original dimensions and insulating properties.

Polymeric foams of the present invention may also be used for insulators against acoustic and/or mechanical energy. Such uses are quite varied. Foams generically have been found useful in such applications. The ability to tailor precisely the Tg, density, cell size, and strength of foams of the present invention and deliver them in a compressed but reexpandable format is of particularly utility. A discussion of factors and uses for such foams generically may be found in the "Polyurethane Handbook", supra

C. Other Uses

The foams of the present invention can also be employed as insulators against acoustic or mechanical forces. When intended for use as insulators against transmission of acoustic and/or mechanical vibrations, these foams are particularly useful in that both the Tg of the material and the width of the transition can be optimized for the specific application. It is generally desirable that the Tg of the foam be closely aligned with the temperature and frequency of the midpoint of the acoustic or vibration energy to be damped.

The foams of the present invention are easily "tuned" to this end, as described below. For example, if a continuous noise of 1000 Hz at 25° C. is to be damped, the Tg of the foam measured at 1000 Hz should be 25° C. If the noise or vibration is of a combination of frequencies (as is usually the case), or if the damping is desired over a wider temperature range, then the glass-to-rubber transition region of the foam should be as broad as possible. Alternately, the foam can be post-treated with a second polymeric material to make a macroscopic interpenetrating network wherein both polymers will contribute to sound/vibration damping at different regions of temperature and frequency. Further descriptions of generic uses of foams as acoustic or mechnical shock insulators are given in Brandup, J.; Immergut, E. H. "Polymer Handbook", 2nd Ed., Wiley-Interscience, New York, N.Y., 1975. pp 240–242 and pp 210–216 and pp 286–325.

IV. Test Methods

A. Dynamic Mechanical Analysis (DMA)

DMA is used to determine the Tgs of polymers including polymeric foams. Samples of the foams are sliced into blocks 3–5 mm in thickness and washed 3–4 times in distilled water, expressing the fluid through roller nips between each washing. The resulting foam blocks are allowed to dry in air. The dried foam slices are cored to yield cylinders 25 mm in diameter. These cylinders are analyzed using a Rheometrics RSA-II dynamic mechanical analyzer set in compression mode using parallel plates 25 mm in diameter. Instrument parameters used are as follows:

Temperature step from ca. 85° C. to −40° C. in steps of 2.5° C.

Soak intervals between temperature changes of 125–160 seconds

Dynamic strain set at 0.1% to 1.0% (usually 0.7%)

Frequency set at 1.0 radians/second

Autotension set in static force tracking dynamic force mode with initial static force set at 5 g.

The glass transition temperature is taken as the maximum point of the loss tangent versus temperature curve.

B. Expansion Factor

Expansion factor can be quantified by measuring the thickness of a foam sample in the compressed state and in the expanded state. The ratio of the expanded thickness to the initial compressed thickness is the expansion factor.

The foam sample in its compressed state is placed on a flat granite base under a gauge suitable for measuring the sample thickness. The gauge is set up to exert a pressure of 0.08 psi on the sample. Any gauge fitted with a foot having a circular surface area of at least 1 in$^2$ (6.5 cm$^2$) and capable of measuring thickness to 0.0010 in. (0.025 mm) can be employed. Examples of such gauges are an Ames-model 482 (Ames Co.; Waltham, Mass.) or an Ono-Sokki model EG-225 (Ono-Sokki Co., Ltd.; Japan). The initial thickness is recorded ($X_0$).

The assembly including the foam is then placed in an oven set at T=Tg+20° C. After 60 minutes, the expanded thickness ($X_1$) is recorded.

The expansion factor (EF) is calculated as EF=$X_1/X_0$. The expansion factor may be recorded after storage at T=Tg+20° C. for 1 day or longer to ensure that complete recovery to the dimensions of the unexpanded sample are obtained. Generally, the sample is left at the higher temperature until no further reexpansion is recorded.

C. Stability in the Compressed State

The foams of the present invention will remain in a substantially compressed state for suitably long periods of time under negligible restraint on the upper surface. Such stability is measured as follows. The foam sample (cylindrical in shape, having a circular surface area equivalent to that of the gauge foot referred to below) in its compressed state (i.e., 33% of original thickness) is placed on a flat granite base under a gauge suitable for measuring the sample thickness. The gauge is set up to exert a pressure of 0.08 psi on the sample. Any gauge fitted with a foot having a circular surface area of at least 1 in$^2$ (6.5 cm$^2$) and capable of measuring thickness to 0.0010 in (0.025 mm) can be employed. Examples of such gauges are an Ames model 482 (Ames Co.; Waltham, Mass.) or an Ono-Sokki model EG-225 (Ono-Sokki Co., Ltd.; Japan). The initial thickness is recorded ($X_0$). This apparatus including the foam is then stored at a temperature of 22° C. for 21 days. The final thickness is then recorded as $X_1$. A Growth Factor (GF) is calculated as GF=$X_1/X_0$. The growth factor should not exceed 1.5 (i.e., 50% reexpansion).

V. Specific Examples

The following examples illustrate the specific preparation of collapsed HIPE foams according to the present invention.

EXAMPLE 1

Preparation of Foam from a HIPE

A) HIPE Preparation

Anhydrous calcium chloride (36.32 kg) and potassium persulfate (189 g) are dissolved in 378 liters of water. This provides the water phase stream to be used in a continuous process for forming the HIPE.

To a monomer combination comprising styrene (2400 g), divinylbenzene 55% technical grade (1200 g; available from Aldrich Chemicals), 2-ethylhexylacrylate (2400 g), is added Span 40™ (480 g; available from ICI Americas), and Tinuvin 765 (30 g; available from Ciba-Geigy Corp.) [bis (1,2,2,5,5-pentamethylpiperidinyl)sebacate]. After mixing, the solution is allowed to settle overnight. The supernatant is withdrawn and used in the oil phase as the emulsifier in forming the HIPE. (About 20 g of a sticky residue is discarded.)

Separate streams of the oil phase (25° C.) and water phase (42°–44° C.) are fed to a dynamic mixing apparatus. Thorough mixing of the combined streams in the dynamic mixing apparatus is achieved by means of a pin impeller. At this scale of operation, an appropriate pin impeller comprises a cylindrical shaft of about 21.6 cm in length with a diameter of about 1.9 cm. The shaft holds 4 rows of pins, 2 rows having 17 pins and 2 rows having 16 pins, each having a diameter of 0.5 cm extending outwardly from the central axis of the shaft to a length of 1.6 cm. The pin impeller is mounted in a cylindrical sleeve which forms the dynamic mixing apparatus, and the pins have a clearance of 0.8 mm from the walls of the cylindrical sleeve.

A spiral static mixer is mounted downstream from the dynamic mixing apparatus to provide back pressure in the dynamic mixer and to provide improved incorporation of components into the emulsion that is eventually formed. Such a static mixer is 14 inches (35.6 cm) long with a 0.5 inch (1.3 cm) outside diameter. The static mixer is a TAH Industries Model 070-821, modified by cutting off 2.4 inches (6.1 cm).

The combined mixing apparatus set-up is filled with oil phase and water phase at a ratio of 3 parts water to 1 part oil. The dynamic mixing apparatus is vented to allow air to escape while filing the apparatus completely. The flow rates during filling are 1.89 g/sec oil phase and 5.68 cc/sec water phase.

Once the apparatus set-up is filled, agitation is begun in the dynamic mixer, with the impeller turning at 1800 RPM. The flow rate of the water phase is then steadily increased to a rate of 45.4 cc/sec and the oil phase flow rate is reduced to 0.82 g/sec over a time period of about 2 min. The back pressure created by the dynamic and static mixers at this point is 13.4 PSI (92 kPa). The impeller speed is then steadily decreased to a speed of 1200 RPM over a period of 120 sec. The back pressure drops to 5.4 PSI (37 kPa). At this point, the impeller speed is instantly increased to 1800 RPM. The system back pressure increases to 6.5 PSI (44 kPa) and remains constant thereafter. The resultant HIPE has a water-to-oil ratio of about 55:1.

B) Polymerization/Curing of HIPE

The HIPE from the static mixer is collected in a round polypropylene tub, 17 in. (43 cm) in diameter and 7.5 in. (10 cm) high, with a concentric insert made of Celcon plastic. The insert is 5 in. (12.7 cm) in diameter at its base and 4.75 in (12 cm) in diameter at its top and is 6.75 in. (17.14 cm) high. The HIPE-containing tubs are kept in a room maintained at 65° C. for 18 hours to cure and provide a polymeric HIPE foam.

C) Foam Washing and Dewatering

The cured HIPE foam is removed from the tubs. The foam at this point has residual water phase (containing dissolved emulsifiers, electrolyte, initiator residues, and initiator) about 50–60 times (50–60×) the weight of polymerized monomers. The foam is sliced with a sharp reciprocating saw blade into sheets which are 0.2 inches (0.5 cm) in thickness. These sheets are then subjected to compression in a series of 2 porous nip rolls equipped with vacuum which gradually reduces the residual water phase content of the foam to about 6 times (6×) the weight of the polymerized monomers. At this point, the sheets are then resaturated with a water at 60° C., are squeezed in a series of 3 porous nip rolls equipped with vacuum to a water phase content of about 4×. The $CaCl_2$ content of the foam is less than about 1%.

The HIPE foam remains compressed after the final nip at a thickness of about 0.019 in. (0.048 cm). The foam is then dried in air for about 16 hours. Such drying reduces the moisture content to about 0–4% by weight of polymerized material. In the compressed state, the density of the foam is about 0.14 g/cc. When expanded in ethanol, its has a dry density of about 0.018 g/cc and has a glass transition temperature of 50° C.

EXAMPLES 2–10

Additional foams were prepared in essentially the same manner as that in Example 1, using different ratios of monomers. The results are shown in Table 1:

TABLE 1

Foam Composition and Tg

| Example # | STY % | DVB %* | EHA % | Tg(°C.)* |
|---|---|---|---|---|
| 2 | 40% | 22% | 38% | 52° |
| 3 | 34% | 22% | 44% | 44° |
| 4 | 32% | 24% | 44% | 50° |
| 5 | 31% | 22% | 47% | 38° |
| 6 | 29% | 24% | 47% | 41° |

TABLE 1-continued

Foam Composition and Tg

| Example # | STY % | DVB %* | EHA % | Tg(°C.)* |
|---|---|---|---|---|
| 7 | 25% | 22% | 53% | 32° |
| 8 | 38% | 22% | 40% | 54° |
| 9 | 36% | 22% | 42% | 49° |
| 10 | 28% | 22% | 50% | 30° |

STY = styrene; available from Aldrich Chemical Corp.
DVB = divinyl benzene, based on 55% purity with 45% ethyl styrene impurity; available from Dow Chemical Corp.
EHA = 2-ethhylhexyl acrylate;available from Aldrich Chemical Corp.
*Determined via Dynamic Mechanical Analysis at 1.0 radians/second.

EXAMPLES 11–15

Additional foams of the present invention were prepared essentially as described in Example 1. The insulating properties of these foams were measured via ASTM C177-85. The results are shown in Table 2.

TABLE 2

Insulating Values for Foams.

| Example # | Density g/cc | STY % | DVB % | EHA % | Tg(°C.) | Thermal Conductivity** |
|---|---|---|---|---|---|---|
| 11 | 0.011 | 20% | 40%ª | 40% | 60° | 38 |
| 12 | 0.012 | 20% | 40% | 40% | 60° | 34 |
| 13 | 0.008 | 0% | 40%ᵇ | 60% | –18° | 37 |
| 14ᶜ | 0.015 | 0% | 33% | 55% | –23° | 34 |
| 15ᶜ | 0.012 | 0% | 33% | 55% | –23° | 35 |

(**Calculated using DMA)
(**Units are mW/(m.K). Calculated using ASTM C177-85)
ª55% pure DVB was used
ᵇ50% pure DVB was used
ᶜ12% 1,6-hexanedioldiacrylate was used The data show excellent thermal insulating properties for the foams of the current invention.

EXAMPLE 16

A continuous sheet of foam made 12" wide and 3" thick is prepared from a HIPE of example 13. This foam is dewatered by passing through compressive dewatering nip rolls with successive gaps of 2", 1", 0.5", and 0.3", washed with 1% sodium bicarbonate solution and dewatered by passing through compressive dewatering nip rolls with successive gaps of 2", 1", 0.5", and 0.3. The continuous foam slice is then laminated to a 0.01" thick aluminum foil, compressed through a porous nip roll at a gap of 0.2" and immediately rolled into a bail about 2.5' in diameter. Due to its low expansion pressure it remains at about 0.5" thick in the bail. This is then packaged in shrink wrap plastic. The foam remains stable in this configuration through warehousing, shipping, retail display, and application. Application takes the form of unrolling the product and inserting it between ceiling joists in a residential attic to the desired cut lengths. The product at that point is still about 0.5" in thickness. Over a relatively short period, with no compressive forces to restrain it, the foam reexpands to its original thickness and density, 3" and 0.008 g/cc respectively, of the foam. This serves as an excellent insulating material, conveniently managed from manufacturer to final use.

What is claimed is:

1. An insulation material comprising a polymeric foam material laminated to a substrate, the polymeric foam material having:

(a) a specific surface area per foam volume of at least about 0.01 m²/cc;

(b) an expanded density of less than about 0.05 g/cc; and (c) a ratio of expanded to compressed thickness of at least about 3:1;

wherein when the foam is compressed to 33% of its original expanded thickness and is thereafter maintained without artificial restraint on its surface, the foam will reexpand by no more than 50% after 21 days at 22° C.

2. The insulation material of claim 1, wherein the polymeric foam material has:

(a) a specific surface area per foam volume of at least about 0.01 m²cc;

(b) an expanded density of from about 0.05 to about 0.006 g/cc;

(c) a ratio of expanded to compressed thickness of at least about 3:1;

(d) a glass transition temperature (Tg) of from about 30° to about 90° C.; and (e) a number average cell size of from about 5 μm to about 80 μm;

wherein when the foam is compressed to 33% of its original expanded thickness and is thereafter maintained without artificial restraint on its surface, said foam will reexpand by no more than 50% after 21 days at 22° C.

* * * * *

UNITED STATES PATENT AND TRADEMARK OFFICE
CERTIFICATE OF CORRECTION

PATENT NO. : 5,753,359

DATED : May 19, 1998

INVENTOR(S) : John Collins Dyer et al.

It is certified that error appears in the above-identified patent and that said Letters Patent is hereby corrected as shown below:

Column 1, line 55, delete "to".

Column 2, line 1, "L. R;" should read -- L. R.; --.

Column 2, line 2, "R;" should read -- R.; --.

Column 2, line 42, "T. A;" should read -- T. A.; --.

Column 3, line 8, "cany," should read -- carry, --.

Column 4, line 60, "thereof," should read -- thereof; --.

Column 4, line 64, "thereof," should read -- thereof; --.

Column 6, line 37, delete "to".

Column 8, line 21, "(LTCD)." Should read -- (RTCD).

Column 8, line 28, "material" should read -- material, --.

Column 8, line 50, "HEPE" should read -- HIPE --.

Column 9, line 31, "Feb. 1" should read -- Feb. 7 --.

Column 11, line 1, "divinyifurans," should read -- divinylfurans, --.

Column 11, line 48, "HPEs" should read -- HIPEs --.

Column 13, line 16, "at-" should read -- at --.

Column 13, line 17, "he" should read -- the --.

Column 13, line 34, delete "is".

UNITED STATES PATENT AND TRADEMARK OFFICE
CERTIFICATE OF CORRECTION

PATENT NO. : 5,753,359
DATED : May 19, 1998
INVENTOR(S) : John Collins Dyer, et. al.

It is certified that error appears in the above-identified patent and that said Letters Patent is hereby corrected as shown below:

Column 15, line 57, "supra" should read -- supra.--.
Column 18, line 1, "filing" should read -- filling --.

Signed and Sealed this

Twenty-first Day of September, 1999

Attest:

Q. TODD DICKINSON

*Attesting Officer*   Acting Commissioner of Patents and Trademarks